United States Patent [19]

Ku et al.

[11] Patent Number: 4,958,176
[45] Date of Patent: Sep. 18, 1990

[54] DRIVING MOTOR CIRCUIT ARRANGED N COUNTER CIRCUIT FOR CAMERA DEVICE

[75] Inventors: Bon J. Ku; Hyun W. Jung, both of Changwon, Rep. of Korea

[73] Assignee: Samsung Aerospace Industries, Ltd., Changwon, Rep. of Korea

[21] Appl. No.: 280,503

[22] Filed: Dec. 6, 1988

[30] Foreign Application Priority Data

Dec. 18, 1987 [KR] Rep. of Korea .................. 8714510

[51] Int. Cl.⁵ .............................................. G03B 1/12
[52] U.S. Cl. ............................................. 354/173.11
[58] Field of Search ........................... 354/173.1, 173.11

[56] References Cited

U.S. PATENT DOCUMENTS 4,818,921  4/1989  Hata et al. .................. 354/173.11 X Primary Examiner—Michael L. Gellner
Attorney, Agent, or Firm—Flynn, Thiel, Boutell & Tanis

[57] ABSTRACT

A camera having the driving motor circuit of the film transfer including a 3 counter circuit 200 inputting a 1 frame transfer signal that the film is transferred frame by frame once the back cover of camera is closed by user, and outputting a 3 counter signal until the film is transferred 3 frame; a switch 100 outputting a film winding signal according to the input of the 3 counter signal of said 3 counter circuit, and inputting a stop signal of the film winding; and a driving motor 300 outputting the stop signal of the film winding and simultaneously performing the film rewinding once the film winding is initiated and completed according to the film winding signal.

8 Claims, 5 Drawing Sheets

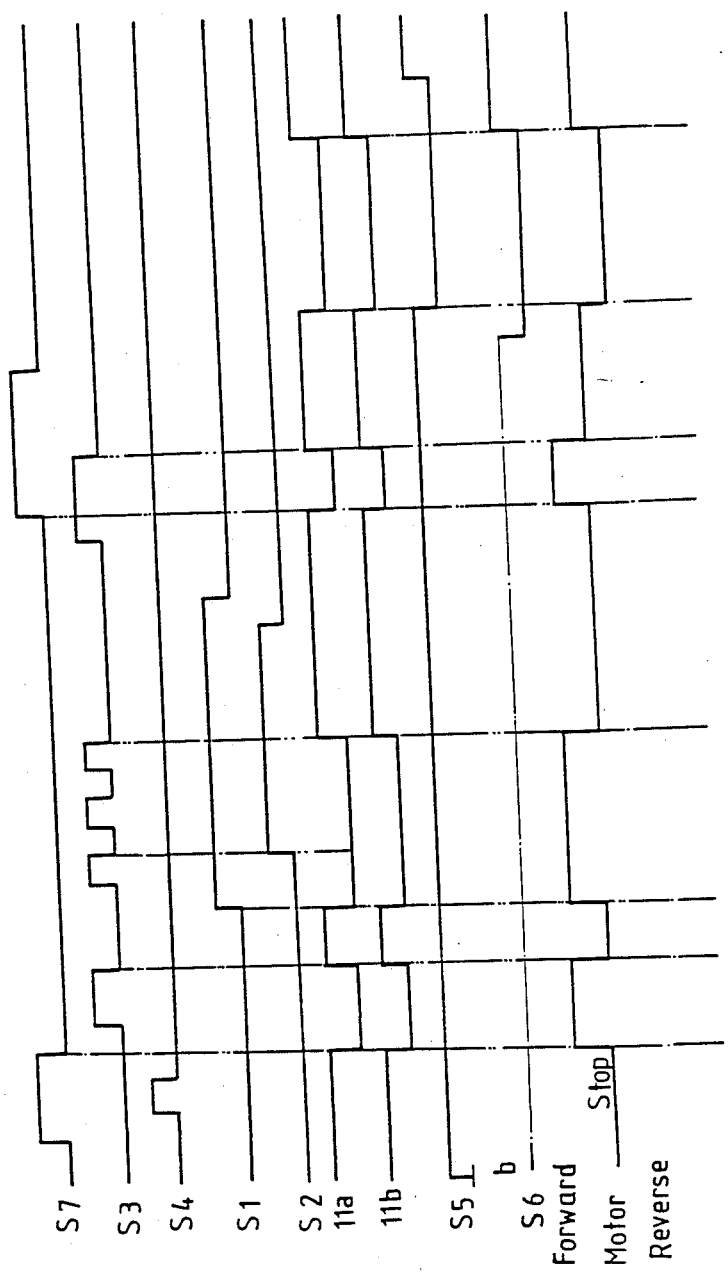

DRIVING MOTOR CIRCUIT ARRANGED N COUNTER CIRCUIT FOR CAMERA DEVICE

BACKGROUND OF THE INVENTION

1. Field of the Invention

The present invention relates in general to a camera device having arranged therein a control circuit of a film automatic transfer device, and more specifically to the driving motor control circuit of the film automatic transfer deivce by which the initial three frames auto are transferred and the film winding and rewinding is auto-operated.

2. Description of the Prior Art

In the conventional camera, when a reversible direction motor is employed, either four transistors for electricity or two relays have been widely utilized to operate the motor in the winding and rewinding direction.

Alternatively, by utilizing the counter dial switch associated with the three frame function, the design to transfer 3 frames is complicated, and multiple devices are employed, and consequently, a manufactured cost is very high.

SUMMARY OF THE INVENTION

It is a principal object of the invention to simultaneously provide an improved control circuit of the film self-transfer device by which the initial three frames are self-transferred and the film winding and rewinding self-operated, and a circuit to prevent an error operation which electronically stored three frame motion.

Accordingly, with the object in view, the invention resides in a camera device having arranged therein the driving motor circuit of the film automatic transfer device, said driving motor circuit characterized by : counter circuit 200 inputting frame transfer signal as the film is transferred frame by frame once the back cover of camera is closed by user, and outputting a counter signal until the film is transferred three frame; the switch 100 outputting the film winding signal 11a according to the input of the 3 counter signal of said counter circuit, and so inputting the stop signal of the film winding; and the driving motor 300 outputting the stop signal of the film winding and simultaneously performing the film rewinding once the film winding is initiated and completed according to the film winding signal of the of said switch.

BRIEF DESCRIPTION OF THE DRAWINGS

A preferred embodiment of the invention will now be described, by way of example only; with reference to the accompanying drawings, wherein:

FIG. 5 is the output wave form view of each portion showing the driving motor circuit of the invention.

DETAILED DESCRIPTION OF THE INVENTION

Figure 1:
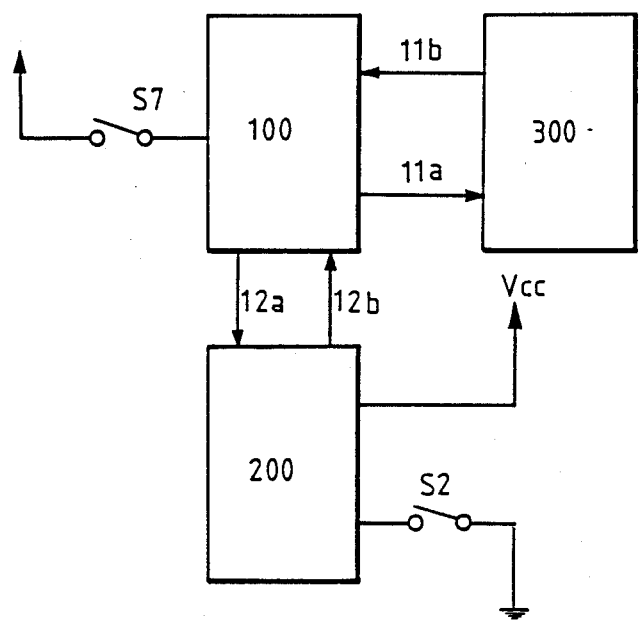
FIG. 1 is the overall block diagram according to the invention.

Referring now to the several drawings, and especially to FIG. 1, as the whole block diagram according to the invention it includes counter circuit 200 inputting the frame transfer signal 12a that the film is transferred frame by (i.e. frame by frame) when the back cover of camera is closed by user, and frame outputting counter signal 12b until the film is transferred three frames, the switch 100 outputting the film winding signal 11a according to the input of counter signal 12b of said counter circuit 200, and also inputting the stop signal 11b of the film winding; the driving motor 300 initiating the film winding in accordance with the film winding signal 11a of said switch 100 and, once the film windings is completed, outputting the stop signal 11b of the film winding and simultaneously performing the film rewinding.

$S_2$ is the dial switch, $S_7$ is the release switch.

When the back cover of the camera is closed by the user, counter circuit 200 outputs counter signal 12b until three frame transfer.

The switch 100 outputs the film winding signal 11a according to the counter signal output from said counter circuit 200, and the driving motor 300 winds the film depending on the film winding signal of said switch 100. When the three frame transfer of the initial film is ended, the counter circuit doesn't output the counter signal. When the film winding of the driving motor 300 is finished, said driving motor 300 automatically rewinds the film.

Figure 2:
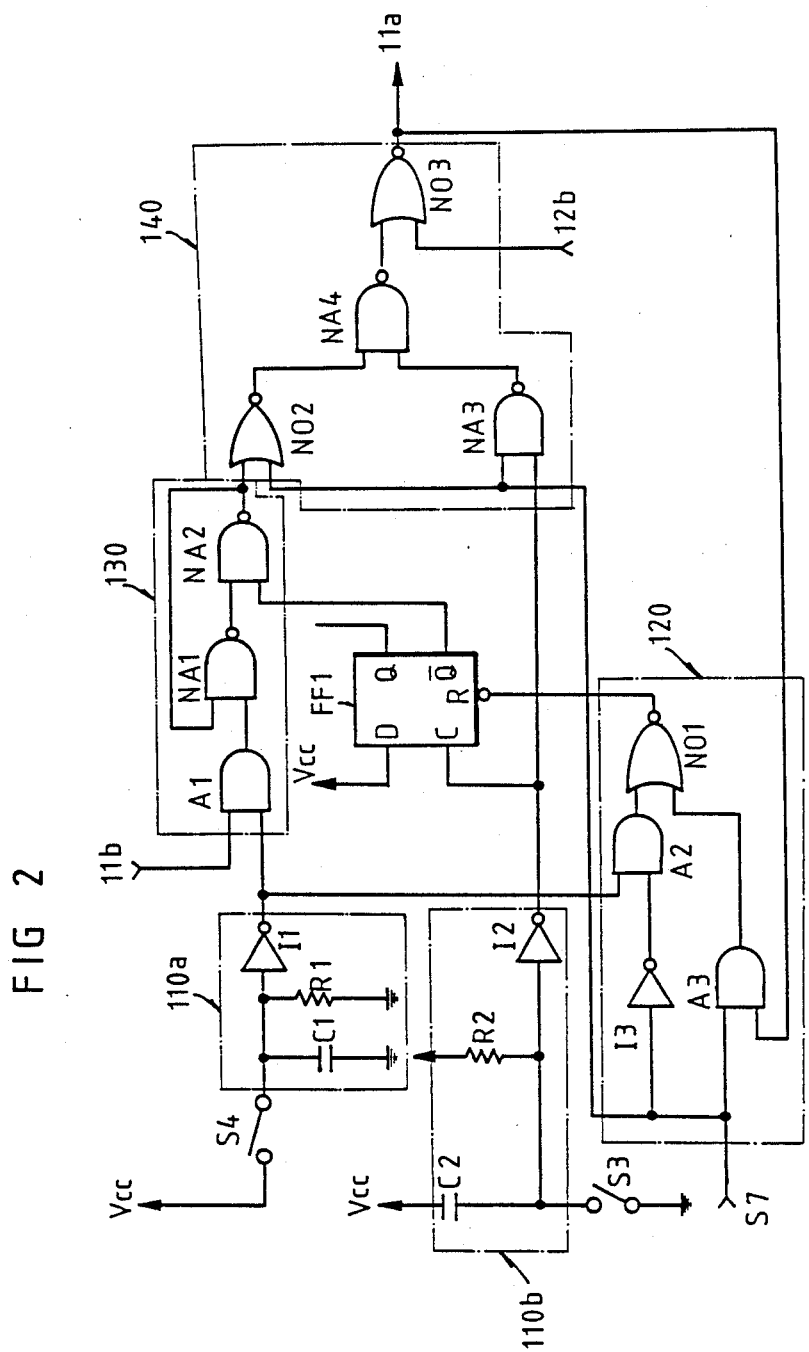
FIG. 2 is the specific circuit view showing the switch of FIG. 1.

Referring now to FIG. 2, the specific circuit view of the switch 100 according to the invention consists of the winding motion switch $S_4$ of the film, frame transfer switch $S_3$ and release switch $S_7$, said switch 100 characterized by in case that said film winding motion switch $S_4$ turns "on", the buffer circuit 110a functions as a buffer depending on a predetermined input signal, which buffer circuit 110a includes a capacitor $C_1$, Resistor $R_1$, and Inverter I ; in the event that said 1 frame transfer switch $S_3$ is "on", the other buffer circuit 110b composed of capacitor $C_2$, Resistor $R_2$, and Inverter $I_2$, functions as a buffer on the basis of a prescribed input signal ; the output circuit 120 of the camera motion signal which outputs the motion signal of the camera on the basis of the "on" state of said Release switch $S_7$, which consists of Inverter $I_3$, AND-gate $A_2$, $A_3$, and NOR-gate $NO_1$; depending on said motion signal of the camera, Flip Flop FF1 constructed to generate the motion ; the control circuit 130 of the film winding motion is composed of AND-gate, $A_1$, NAND-gate $NA_1$, $NA_2$, and outputs the control signal according to the output signal of said film winding motion switch $S_4$ and Flip Flop $FF_1$; the film winding signal output circuit 140 composed of NOR-gate $NO_2$, $NO_3$, NAND-gate $NA_3$, $NA_4$, outputs the film winding signal depending on said control signal, frame transfer signal, and counter signal.

Accordingly, in case that said Release switch $S_7$ turns "on", Flip Flop $FF_1$ initializes the operation after Reset, and therefore, the frame transfer switch $S_3$ and the film winding motion switch $S_4$ automatically turn "on", and consequently output the film winding signal 11a.

Figure 3:
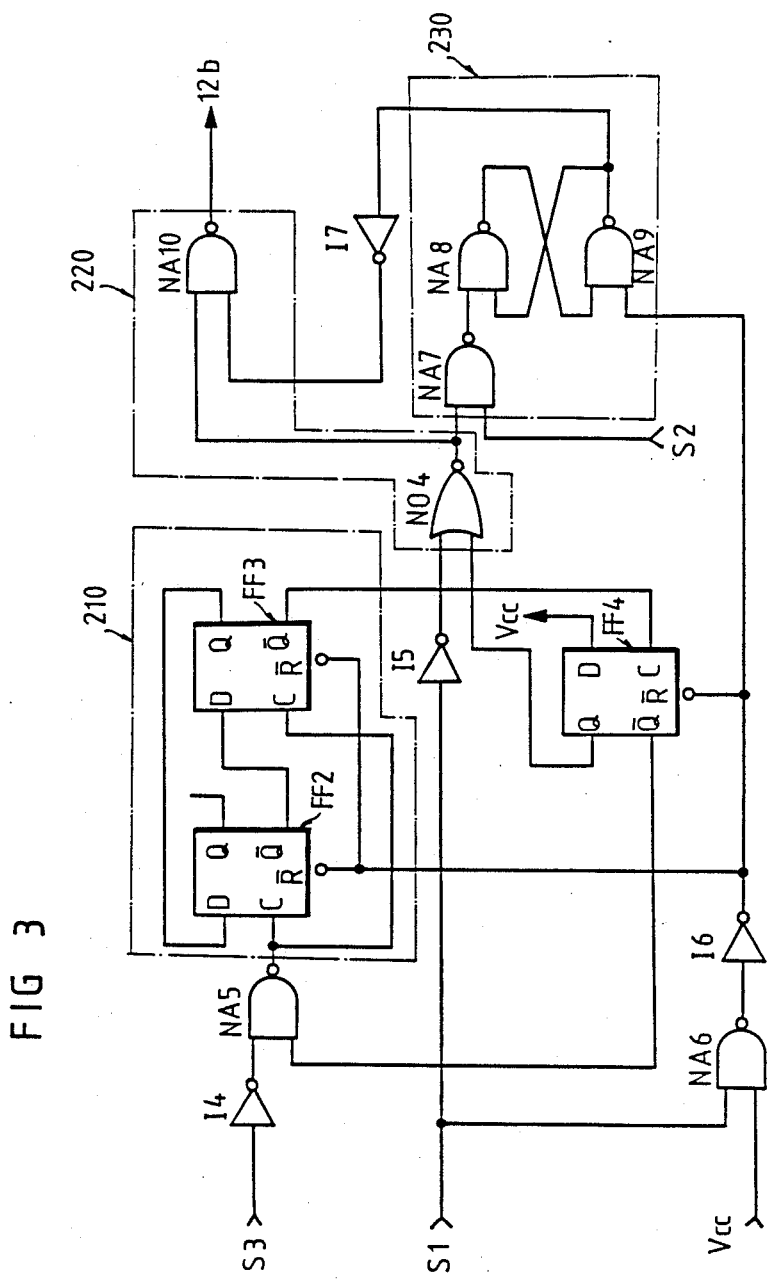
FIG. 3 is the specific circuit view showing 3 counter circuit of FIG. 1.

The invention will become more readily apparent from the following deseription of preferred embodiments thereof shown, in the accompanying FIG. 3 and FIG. 5.

FIG. 3. showing the specific circuit view of counter circuit 200 according to the invention is characteristic that back cover switch $S_1$ which turned "on" as the back cover of the camera is closed by user, which turned "OFF" as opened ; NAND-gate $NA_6$ and Inverter $I_6$ therewith ; Dial switch $S_2$ which is turned "OFF" before counter initiation, and which is turned "on" after counter initiation ; frame transfer switch $S_3$ which is turned "ON-OFF" every one frame transfer of the film ; Inverter $I_4$ and NAND-gate $NA_5$ therewith ; the counter 210 composed of Flip Flop $FF_2$, $FF_3$ for counting the clock signal generated according to "ON-OFF" of said 1 frame switch ; Flip Flop $FF_4$ constructed to store the counting output from said counter 210 ; the output decision circuit 220 of counter signal comprising NOR-gate $NO_4$, NAND-gate $NA_{10}$, for deciding the output of counter signal in accordance with the output signal of said Back cover switch $S_1$ and Flip Flop $FF_4$; Dial switch Sensor circuit 230 composed of NAND-gate $NA_7$, $NA_8$, $NA_9$, for sensing "ON-OFF" state of dial switch $S_3$.

Referring hereafter to FIG. 2, the action effect will be described.

When the back cover of the camera is closed by user, Flip Flop $FF_1$-$FF_4$ is reset by the output of backcover switch $S_1$ through NAND-gate $NA_6$, Inverter $I_6$, therefore, the counter 210 begins counting the input tulse of frame transfer switch $S_3$.

In addition, the output of said switch $S_1$ is applied to NAND-gate $NA_{10}$ through Inverter $I_5$ and NOR-gate $NO_4$, and therefore, generation of the counter signal 12$b$ occurs Said 3 counter output 12$b$ is applied to the output circuit 140 of the film winding signal shown in FIG. 2 and thus permits the film winding signal 11$a$ to be output, and this film winding signal 11$a$ is applied to the film winding and stop signal generation circuit 310.

On the other hand, three frame self-transfer means via said frame transfer switch $S_3$ is accomplished by said frame transfer switch $S_3$ and dial switch $S_2$, said counter 210 is stored through a terminal C of $FF_4$, said frame transfer switch $S_3$ operating "ON-OFF" for every one frame of the film that is transferred.

If said counter 210 is entered the third frame transfer signal, Flip Flop $FF_3$ output signal Q is low, the reverse output signal $\bar{Q}$ is high, and consequently, NOR gate $NO_4$ is applied at high through Flip Flop $FF_4$.

Accordingly, without respect to other input, said NOR gate $NO_4$ permits the low signal to be output and counter signal 12$b$ to be output through NAND-gate $NA_{10}$, and which outputs high through NAND-gate $NA_7$-$NA_9$ of the dial switch sensor circuit 230, and therefore, this high signal which reversed through Inverter $I_7$, that is, the low signal is applied to the other terminal of said NAND-gate $NA_{10}$.

In this respect, even if Flip Flop $FF_2$-$FF_4$ inoperates via error, since said dial switch sensor circuit 230 is applied said NAND gate $NA_{10}$ low signal, it functions to keep counter signal 12$b$ caused an error operation normally.

Alternatively, although counter signal 12$b$ is low, the signal to stop the motor, e.g., the film winding stop signal 11$a$ is output by the signal frame transfer switch $S_3$ turned OFF through the inverter $I_2$, NAND-gate $NA_3$, $NA_4$NOR-gate $NO_3$.

Furthermore, even if counter signal 12$b$ is low, since said NOR-gate $NO_3$ is wholly depended on NAND-gate, $NA_4$, the motor may be controlled by said frame tansfer switch $S_3$.

Figure 4:
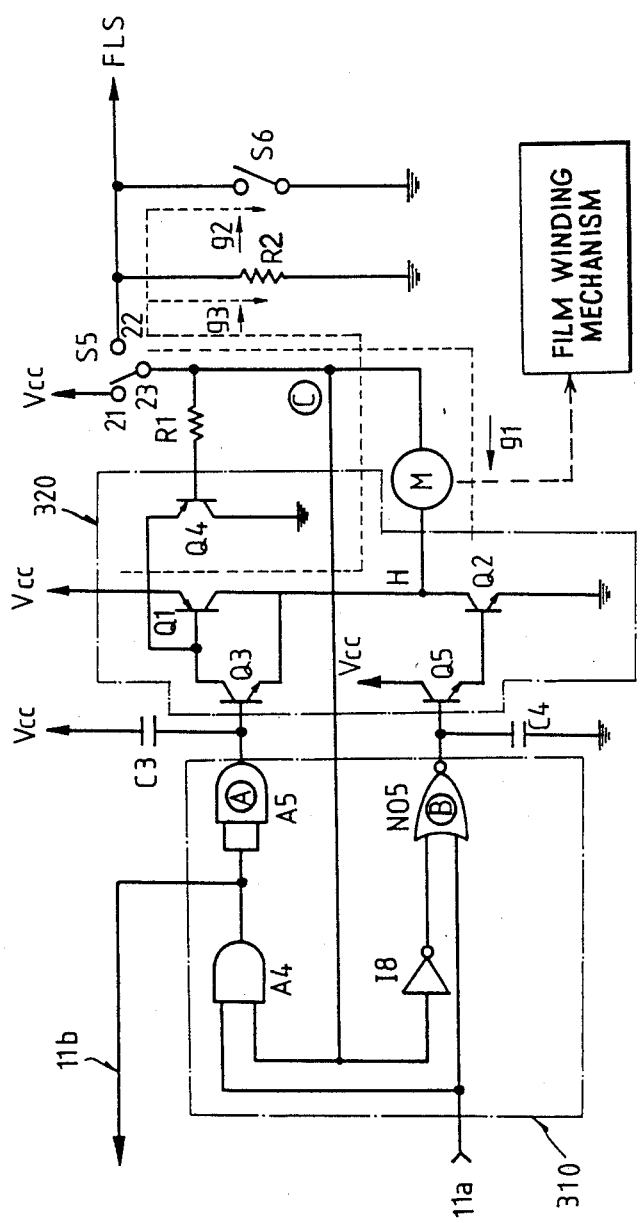
FIG. 4 is the specific circuit view showing the driving motor of FIG. 1.

FIG. 4 shown as the specific circuit of the driving motor 300 according to the invention comprises the film winding and stop signal generation circuit 310 of the motor composed of AND-gate $A_4$, $A_6$, the inverter $I_8$, NOR-gate $NO_5$, for controlling the film winding stop signal 11$b$ and winding signal 11$a$ of the motor according to a predetermined input signal ; the motor control circuit 320 includes the transistors $Q_1$-$Q_5$, the resistor $R_1$ for controlling in correpondence with the output of the motor stOP signal and winding signals ; the film rewinding cut-off switch $S_5$ composed of the terminals 21, 22. 23 for changing the switch position; the resistor $R_2$ and the film winding switch $S_6$ constructed to stop the film rewinding and the motor according to the position of said film rewinding cut-off switch $S_5$; and the motor M operated in accordance with a prescribed input signal, and which drives a conventional film winding mechanism to transfer the film Herewith, when the film winding signal 11$a$ and switch $S_5$ terminal 23 is "high", the output of AND-gate $A_4$, $A_5$is high, the output of NOR-gate $NO_5$ is "low", and thus transistor $Q_3$, $Q_1$ is "on", the transistor $Q_5$, $Q_2$, $Q_4$ turns "OFF", and therefore, the motor is stationary without the current flow through the motor. On the contrary, when the film is moved comma by frame, if desired, in the event that said film winding signal 11$a$ is low and the switch $S_5$ terminal 23 is turned high, said AND-gate $A_4$, $A_5$ output turns "low", the output of NOR-gate $NO_5$ turns "high".

Consequently, each transistor $Q_3$, $Q_1$ turns "OFF" and the transistor $Q_5$, $Q_2$, $Q_4$ turns "ON", and thus the current direction is $g_1$, the motor is driven in the film transistor direction (the Positive rotation).

Instantaneously, once said film winding signal 11$a$ turns high, said transistor $Q_5$, $Q_2$ is off, and therefore, the motor is stationary.

Alternatively, when the film is rewinded by user, the film rewinding cut-off switch $S_5$ is cut-off the terminal 22, if the film winding switch $S_6$ turns "on", one side of the terminal point C is grounded through the switch $S_5$, $S_6$. Thereby, said switch $S_6$ turns on if the film is loaded; otherwise turns off.

Furthermore, one part of the low signal of said terminal point C is output as it is through AND-gate $A_4$, $A_5$, and therefore, the transistor $Q_3$ turns off; since the other part is output the low signal through the inverter $I_8$ and NOR-gate $NO_5$, the transistor $Q_5$, also turns off.

Alternatively, since said terminal point C is low, the transistor $Q_4$ turns on due to the low signal through the resistor $R_1$ and thus the transistor $Q_1$ turns on, the current flow of the motor M associated with the collector of the transistor flows in the $g_2$ direction of said switch $S_6$, consequently said motor is operated in the opposite direction.

That is, the loaded film is, rewound Once the film rewinding is completed, said switch $S_6$ turns off, and since said current direction $g_2$ is cutoff, said motor M stops operating.

From the foregiong, it can be seen that the current flow is the state of the resistor $R_2$ direction $g_3$, since resistor $R_2$ value is more than that of the motor, the potential level Vcc of the terminal point C is high in terms of the principle's Voltage distribution, the high signal inputs to said AND-gate $A_4$ and the inverter $I_8$, and thus the motor returns to the positive rotation.

As mentioned above, an advantage to this type of arrangement is that an initial three frames comma can be self-transferred, the film winding and rewinding can be self-operated, simultaneously 3 frame operation electronically stored in memory, consequently which leads to preventing in operation.

When specific embodiments of the invention have been descirbed in detail, it will be appreciated by those skilled in the art that various modifications and alterations would be developed in light of the over all teachings of the disclosure Accordingly, the particular arrangements disclosed are meant to be illustrative only and not limiting as to the scope of the invention which is to be given the full breadth of the appended claims and any and all equivalents thereof.

What is claimed is:

1. A camera device having arranged therein a driving motor circuit for a film automatic transfer device, said driving motor cuircuit including counter circuit means for inputting a frame transfer signal as the film is transferred frame by frame once the back cover of the camera is closed, and for outputting a counter signal until the film is transferred by three frames switch means for outputting a film winding signal in response to at least the counter signal of said counter circuit means; and a driving motor unit for performing film winding and for simultaneously performing film rewinding once the film winding is completed, said driving motor unit including means responsive to the film winding signal for actuating film winding.

2. A camera device according to claim 1, wherein said counter circuit means comprises a backcover switch which is turned to an "on" state as the backcover of the camera is closed, and turned to an "OFF" state as the backcover is opened; a Dial switch which is turned "OFF" before initiation of said counter signal; counter means for counting a clock signal generated according to said frame transfer signal; a Flip Flop constructed to store the counting outputted from said counter means; an output decision circuit for defining the counter signal in accordance with the state of said backcover switch and said Flip Flop and a Dial switch sensor circuit for disabling generation of the counter signal according to the "ON-OFF" state of said Dial switch.

3. A camera device according to claim 1, characterized in that the driving motor unit comprises a motor; said film winding actuation means including a film winding and stop signal generation circuit of the motor for producing a motor stop and winding signal according to a predetermined input signal; and a motor control circuit for controlling the motor in correspondence with the motor stop and winding signal; said driving motor unit further including a film rewinding cut-off switch composed of terminals which permit changing the film rewinging cut-off swtich position according to the film state; a resistor and a switch constructed to stop the film rewinding and the motor according to the position of said film rewinding cut-off switch; and the motor being operable according to a prescribed input signal.

4. A camera device according to claim 1, characterized in that the switch means incudes a film winding motion switch, a frame transfer switch for producing said frame transfer signal, and a release switch, first and second buffer circuits for respectively buffering an input signal according to operation of said film winding motion switch, and said frame transfer signal; a camera motion signal output circuit for providing a camera motion signal according to the operation of one of said frame transfer switch and said release switch; a Flip Flop operating according to said camera motion signal; a film winding motion control circuit for controlling the film winding signal corresponding to respective output signals of said film winding motion switch and said Flip Flop; and a film winding signal output circuit for defining the film winding signal corresponding to said counter signal, and one of said release switch, said frame transfer switch and said film winding motion switch.

5. A film winding control device for controlling the winding of film in a camera, comprising:

a film winding mechanism for winding the film to effect a transfer thereof, rotatable drive means for driving said film winding mechanism, and actuating means for actuating said rotatable drive means, said actuating means including film positioning means for automatically causing said rotatable drive means and said film winding mechanism driven thereby to transfer a first predetermined length of film immediately after the film is loaded in the camera, said film positioning means including counting means for maintaining during said film winding a cumulative running total which represents a total number of predetermined equal incremental lengths of film which have been transferred by said film winding mechanism, said predetermined equal incremental lengths of film being smaller than said first predetermined length of film.

6. The device according to claim 5, wherein said rotatable drive means includes an electric motor, said actuating means including an electric power source which is selectively connectable to said electric motor, and switch means having plural switch terminals, a first said switch terminal being selectively electrically connectable to respective second and third said switch terminals, said actuating means further including reversible electrical drive means responsive to said switch means and coupled to said electric power source for driving said electric motor to selectively wind the film for transfer in a first direction when said first and second switch terminal are connected and in second direction opposite said first direction when said first and third switch terminal are connected.

7. The device accordingto claim 6, wherein said first switch terminal is connected to said electric motor, said second switch terminal being connected to said electric power source, and said third switch terminal being connected to an electrical ground.

8. The device according to claim 7, wherein said reversible electrical drive means includes means for selectively inserting a resistor so that is connected between said third switch terminal and said electrical ground while said first and third switch terminals are connected.

* * * * *

UNITED STATES PATENT AND TRADEMARK OFFICE
CERTIFICATE OF CORRECTION

PATENT NO. :  4,958,176
DATED      :  September 18, 1990
INVENTOR(S):  Bon J. KU et al It is certified that error appears in the above-identified patent and that said Letters Patent is hereby corrected as shown below:

Column 5, line 12; change "cuircuit" to ---circuit---.
         line 16; after "frames" insert ---;---.
         line 35; after "Flip Flop" insert ---;---.

Column 6, line 44; change "terminal" to ---terminals---.
                   after "in" insert ---a---.
         line 46; change "terminal" to ---terminals---.
         line 47; change "accordingto" to ---according to---.

Signed and Sealed this

Seventeenth Day of March, 1992

Attest:

HARRY F. MANBECK, JR.

*Attesting Officer*         *Commissioner of Patents and Trademarks*